US005735651A

United States Patent [19]
Harroun

[11] Patent Number: 5,735,651
[45] Date of Patent: Apr. 7, 1998

[54] SPINDLE EXTENSION WITH SELF-CONTAINED DRAW BAR

[76] Inventor: Hugh Harroun, 1101 Fenway Cir., Fenton, Mich. 48430

[21] Appl. No.: 473,861

[22] Filed: Jun. 7, 1995

Related U.S. Application Data

[63] Continuation-in-part of Ser. No. 298,473, Aug. 29, 1994.

[51] Int. Cl.$^6$ ........................................................ B23C 5/26
[52] U.S. Cl. ................................................ 409/233; 408/240
[58] Field of Search ................................ 409/233, 234, 409/232; 408/239 A, 239 R, 238, 240

[56] References Cited

U.S. PATENT DOCUMENTS

| | | | |
|---|---|---|---|
| 3,269,271 | 8/1966 | Bruckner | 409/223 |
| 4,334,811 | 6/1982 | Trumpf et al. | 409/223 |
| 4,548,532 | 10/1985 | Watanabe et al. | 409/223 |
| 4,589,808 | 5/1986 | O'Connor | 409/223 |
| 4,822,220 | 4/1989 | Danielsson et al. | 409/223 |
| 5,342,155 | 8/1994 | Harroun | 409/131 |

FOREIGN PATENT DOCUMENTS

| | | | |
|---|---|---|---|
| 0024944 | 2/1984 | Japan. | |
| 20832 | 2/1985 | Japan | 409/233 |
| 251036 | 10/1987 | Japan | 409/233 |
| 513793 | 6/1976 | U.S.S.R. | |
| 65675 | 4/1979 | U.S.S.R. | |
| 780989 | 11/1980 | U.S.S.R. | 409/233 |

*Primary Examiner*—William R. Briggs
*Attorney, Agent, or Firm*—Rader, Fishman and Grauer, PLLC

[57] ABSTRACT

A spindle extension, especially for drilling and milling operations is desirable to complete many modern die molds or to protect the host machine spindle from undesirable wear. The inventive spindle extension contains its own adjustable length draw bar assembly that works in tandem with the host machine power draw bar that is easily activated to provide quick and secure tool changes. Surrogate and long-reach embodiments are disclosed.

20 Claims, 5 Drawing Sheets

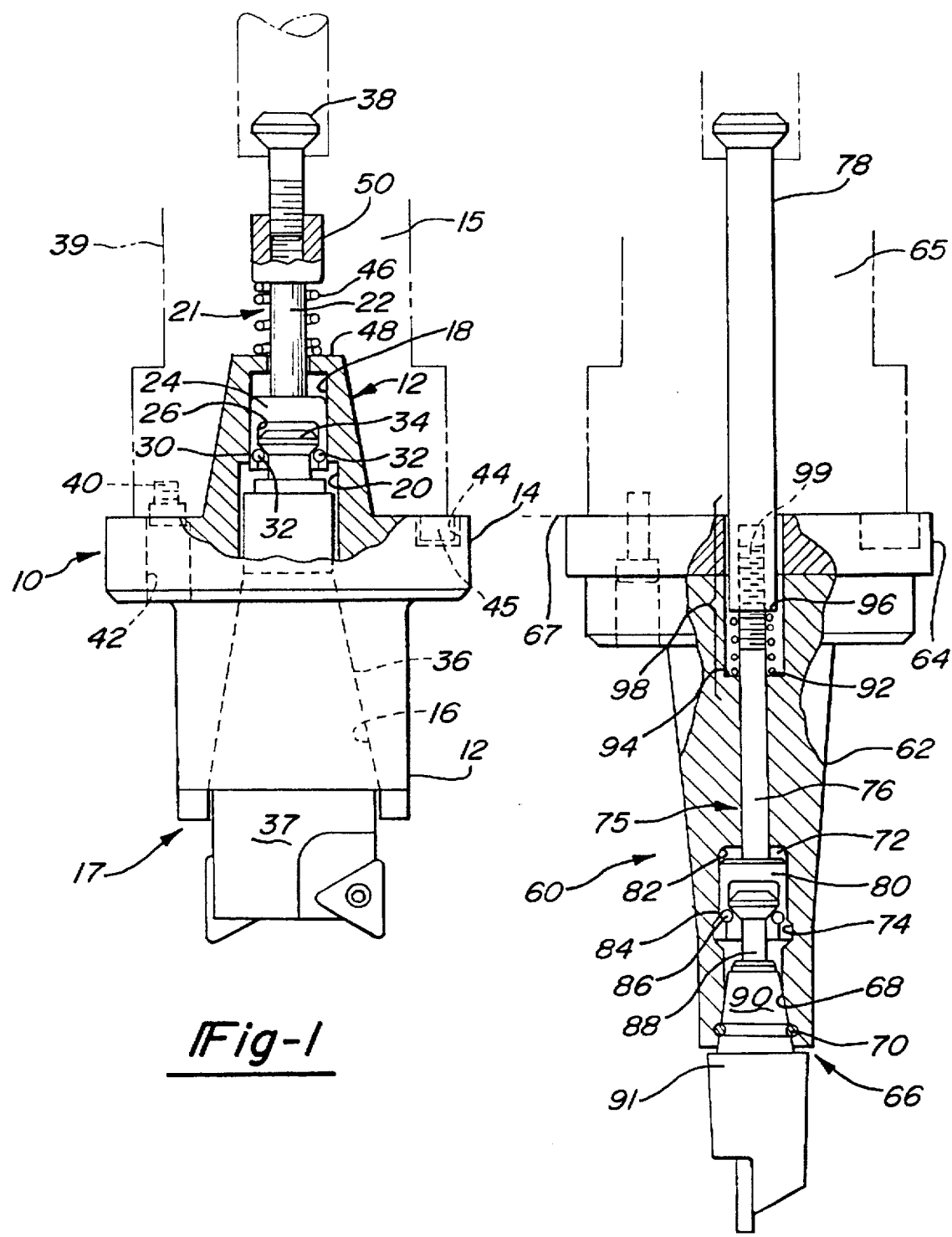

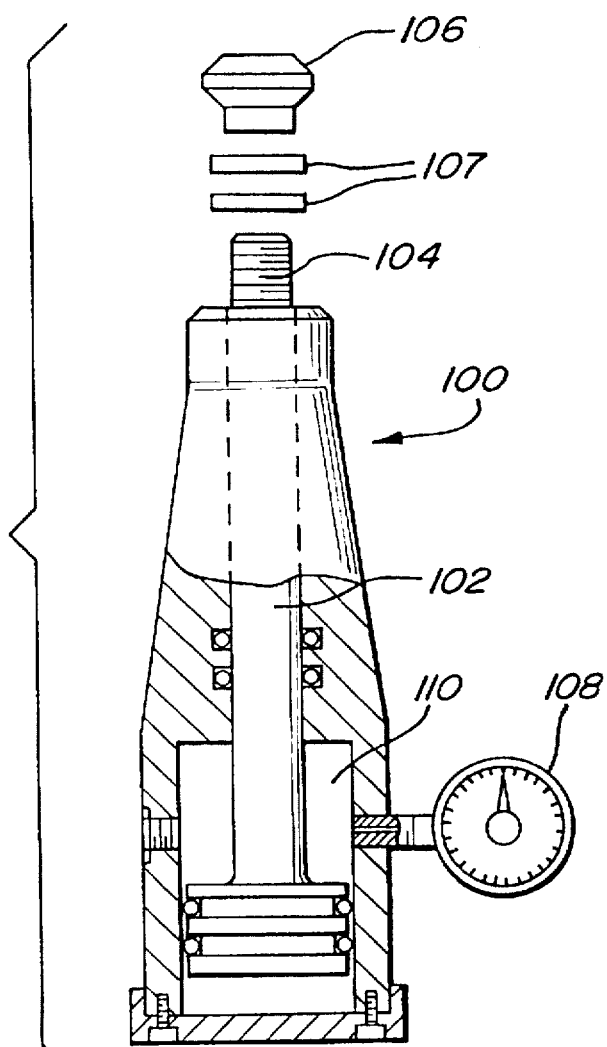
*Fig-4A*
PRIOR ART
*Fig-4B*
PRIOR ART
*Fig-3*
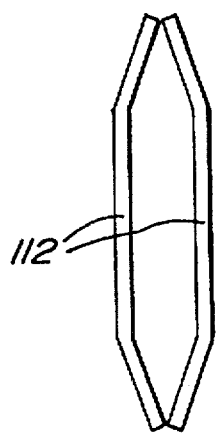
*Fig-4C*
PRIOR ART

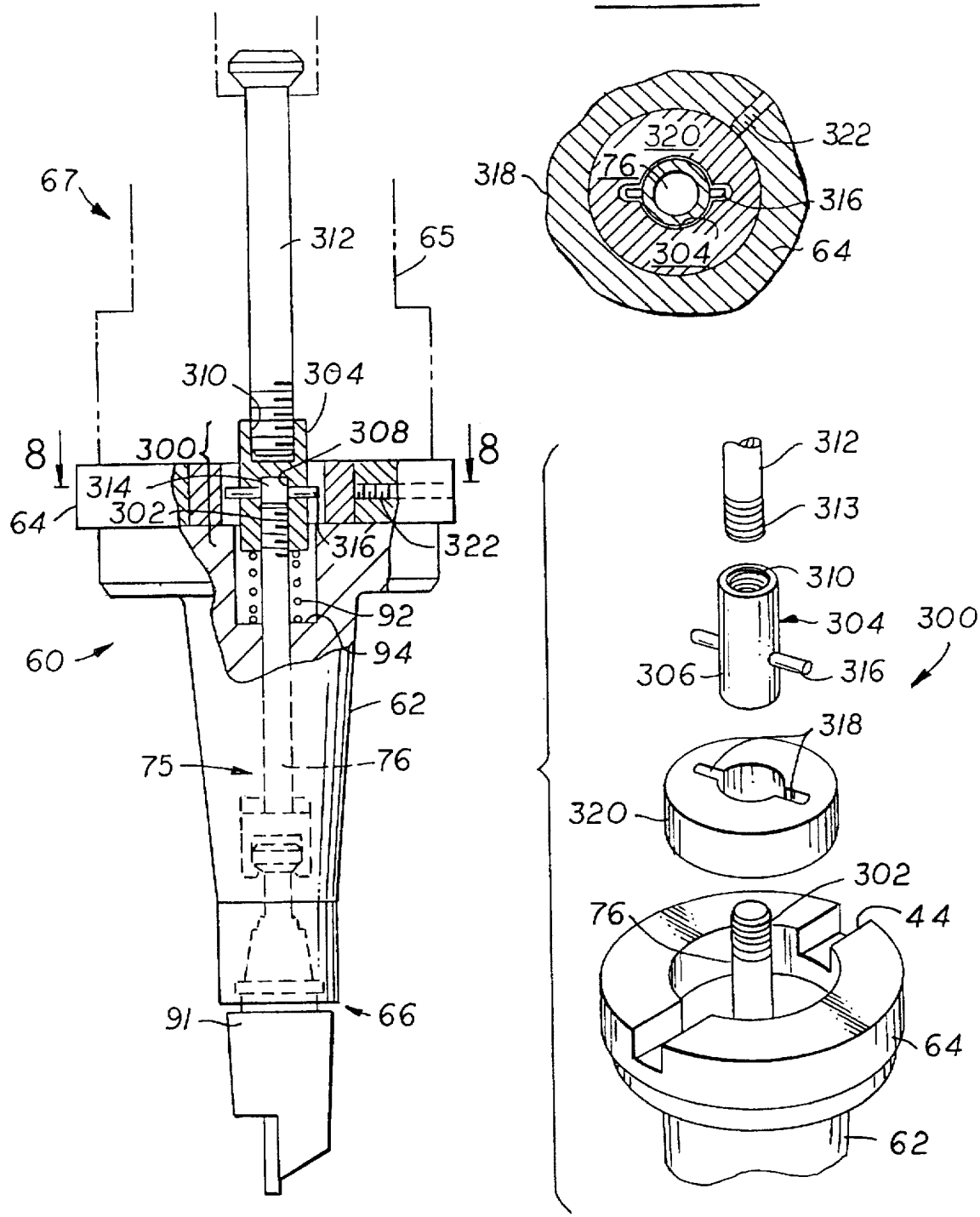

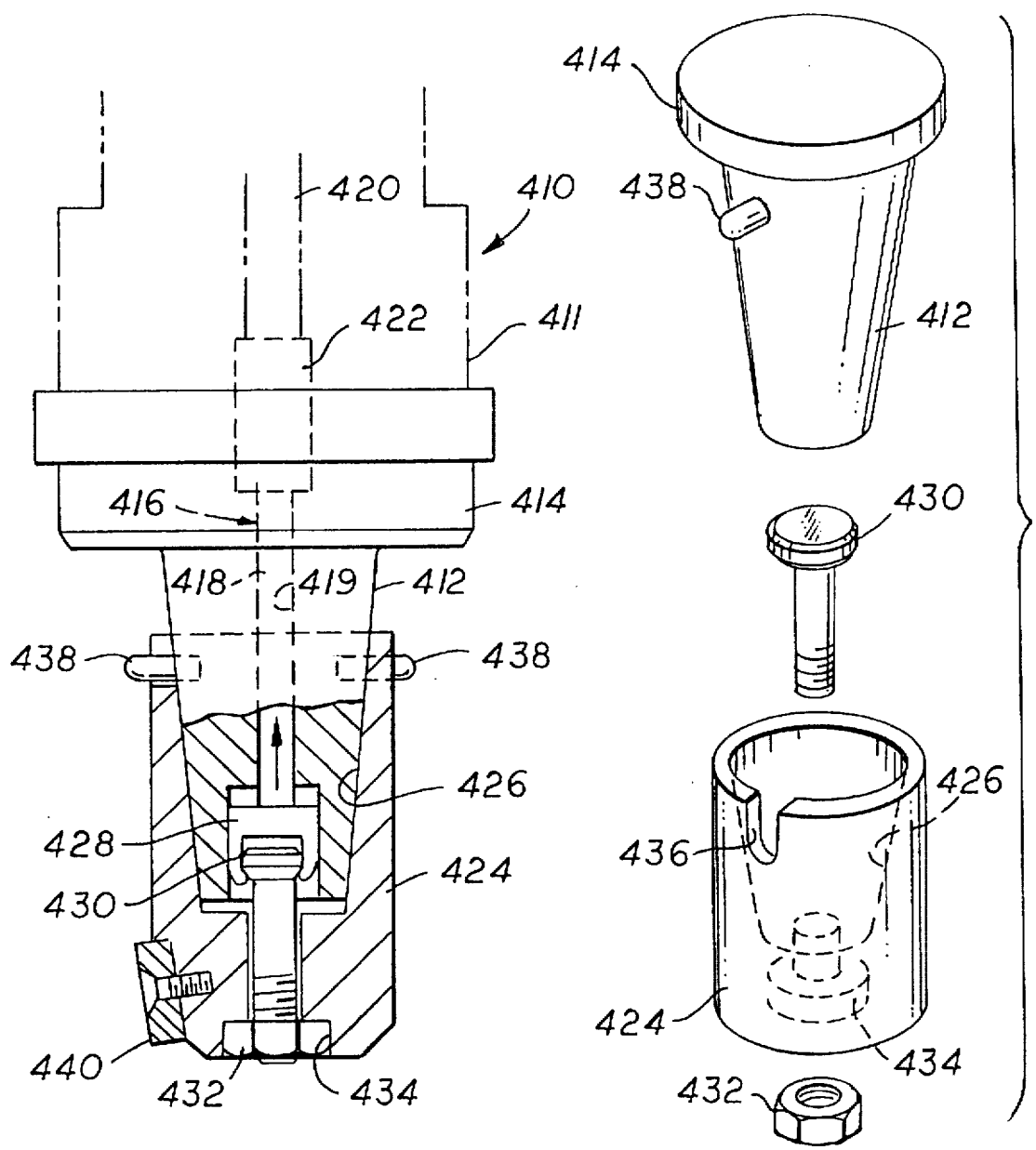

SPINDLE EXTENSION WITH SELF-CONTAINED DRAW BAR

This application is a Continuation-in-Part of the application having Ser. No. 298,473, filed Aug. 29, 1994.

BACKGROUND OF THE INVENTION

This invention relates to a milling machine spindle extension having a self-contained, adjustable length draw bar assembly.

There are two widely recognized problems within the profile milling industry. First, modern molds and dies currently include deeper cavities than were previously used. Standard milling tools are typically too short to construct such deep cavities Second, direct coupling of a milling tool to a host machine spindle may result in undesirable wear and abuse to that spindle during heavy milling operations.

Commonly attempted solutions to the two noted problems include spindle extensions. Two different types of spindle extensions are employed to alleviate the two problems. A long-reach spindle extension can help achieve deeper mold cavities. Surrogate spindle extensions help to minimize the wear and abuse to a host machine spindle bore during heavy milling. The surrogate extensions are typically much shorter and more durable than the long-reach extensions. Previously, both types of extension include the undesirable feature that, once attached to the machine spindle, the machine power draw bar tool-connecting apparatus is unusable. The latter feature renders spindle extensions cost inefficient relative to conventional milling directly from the host machine spindle.

A commonly used spindle extension, for both types of applications described above, is called a weldon shank spindle extension. There are several problems with weldon shank configurations stemming from the necessary use of set screws that maintain the tool in a secured position within the spindle extension. The set screws cause tool holder elongation that increases tool vibration and tends to hasten tool runout. Further, set screws tend to vibrate loose during heavy milling operations. Other problems with weldon shank configurations include the low percentage of surface contact between the tool shank and the spindle extension tool receiving bore, again causing excess vibration.

Other spindle extensions include collet systems in which a tool holder is secured by a draw bolt contained within the spindle extension. Draw bolt collet systems are inefficient because the entire extension must be removed from the host machine to access the draw bolt for tool changes. Other collet systems use exterior nuts to secure a tool in place but these have several disadvantages. A main disadvantage is that an exterior nut increases the diameter of the extension which results in a lower clearance profile, and possible inaccurate die making. A high clearance profile is essential when utilizing a long-reach spindle extension. A second disadvantage to the collet systems is that a relatively large amount of extra time and tools are needed for a machine operator to complete a tool change and resume a milling operation.

One other type of extension utilizes threaded tool connections. Threaded tool connections are solid, however, they also have disadvantages. The biggest difficulty involved with threaded tool connections is that the tool may seize within the extension due to the high torques associated with normal milling operation. Thus, threaded tool connections are not a viable alternative for the current milling industry.

SUMMARY OF THE INVENTION

This invention provides a spindle extension that firmly holds tools, allows quick, easy tool changes and promotes accurate milling. Thus, the spindle extension of this invention provides a strong, accurate and efficient method of extending the length of a milling tool to achieve deeper mold cavities and to preserve the integrity of the host machine spindle bore. Moreover, the present invention allows a machine operator to use various tools in a wider variety of milling operations thereby ensuring optimum tool performance and economies.

In general terms, a spindle extension according to this invention includes a generally cylindrical extension sleeve that connects to a standard milling machine spindle. The end of the cylindrical extension opposite the machine holds a milling tool firmly in place in a manner that allows easy tool changes. The tool is held in place through the use of an adjustable length draw bar assembly that is contained within the spindle extension. The inventive configuration achieves the goals of promoting accurate, deeper mold cavities and/or protecting the host machine spindle bore from undesirable wear, while allowing a milling machine operator to quickly and effectively change tools.

The adjustable length draw bar that is part of a spindle extension designed in accordance with this invention includes a bar that is partially disposed and axially movable within the extension sleeve. A first end of the bar, which is at an end distal from the machine, is specifically adapted to engage a tool and hold it firmly in place. A pull member is connected to the bar at an end of the bar opposite from the tool. The pull member is received in the machine spindle and is adapted to be engaged by the host machine power draw bar apparatus. A means for adjusting a length of the draw bar assembly is provided.

In a preferred embodiment, the means for adjusting the length of the draw bar assembly includes a threaded end on at least one of the pull member or bar of the draw bar assembly. The threaded end cooperates with a mating threaded member, which can be disposed at the adjacent end of the pull member or bar, such that the bar and pull member can be manipulated relative to each other to thereby adjust a length of the draw bar assembly.

The extension draw bar assembly is preferably activated by a hydraulic power draw bar on a host machine. The extension draw bar assembly is preferably spring biased towards the machine such that the host machine power draw bar can engage one end of the extension draw bar assembly. Upon activating the host machine power draw bar, the extension draw bar assembly is pulled into the spindle extension, firmly grasping and pulling a tool into the desired engagement with the spindle extension.

The extension draw bar assembly is preferably adjustable in length because a single length extension bar assembly that acts in unison with the host machine power draw bar may not be feasible in many applications. A long-reach spindle extension, as discussed above, requires a small diameter to accommodate high profile milling operations. This size limitation dictates that any draw bar assembly within the spindle extension be of small diameter. A small diameter bar assembly may not easily adapt to the forces applied by a standard milling machine hydraulic power draw bar apparatus. By providing an adjustable length draw bar assembly within the inventive spindle extension, the problem of adaptability is eliminated.

The tool receiving end of the spindle extension is configured to avoid rotation of the tool relative to the spindle extension. This is preferably accomplished by the inclusion of a stop member, such as a driving dog. In the presently preferred embodiment, a pair of driving dogs are disposed on the outer surface of the extension sleeve. Such driving dogs are received within cooperating slots in an inner bore of a tool that is received over the end of the extension sleeve.

These and other features and objects of the present invention can best be understood from the following specification and drawings, of which the following is a brief description.

BRIEF DESCRIPTION OF THE DRAWINGS

FIG. 1 is a longitudinal, partial cross-sectional view of one embodiment of the inventive surrogate spindle extension holding a tool firmly in place.

FIG. 2 is a longitudinal, partial cross-sectional view of one embodiment the inventive long-reach spindle extension positioned to release or receive a tool.

FIG. 3 is a longitudinal, partial cross-sectional view of a gauging device for use with the inventive long-reach spindle extension.

FIGS. 4(a) through 4(c) are planar view diagrams of compression springs typically employed in a host machine power draw bar apparatus.

FIG. 7 is a longitudinal, partially cross-sectional view of another embodiment of the inventive spindle extension.

FIG. 8 is a cross-sectional view taken along the lines 8—8 in FIG. 7.

FIG. 9 is a perspective, exploded view of selected portions of the embodiment of FIG. 7.

FIG. 10 is a longitudinal, partially cross-sectional view of still another embodiment of this invention.

FIG. 11 is an exploded, perspective view of portions of the embodiment of FIG. 10.

DETAILED DESCRIPTION OF THE PREFERRED EMBODIMENTS

Figures 5, 6:
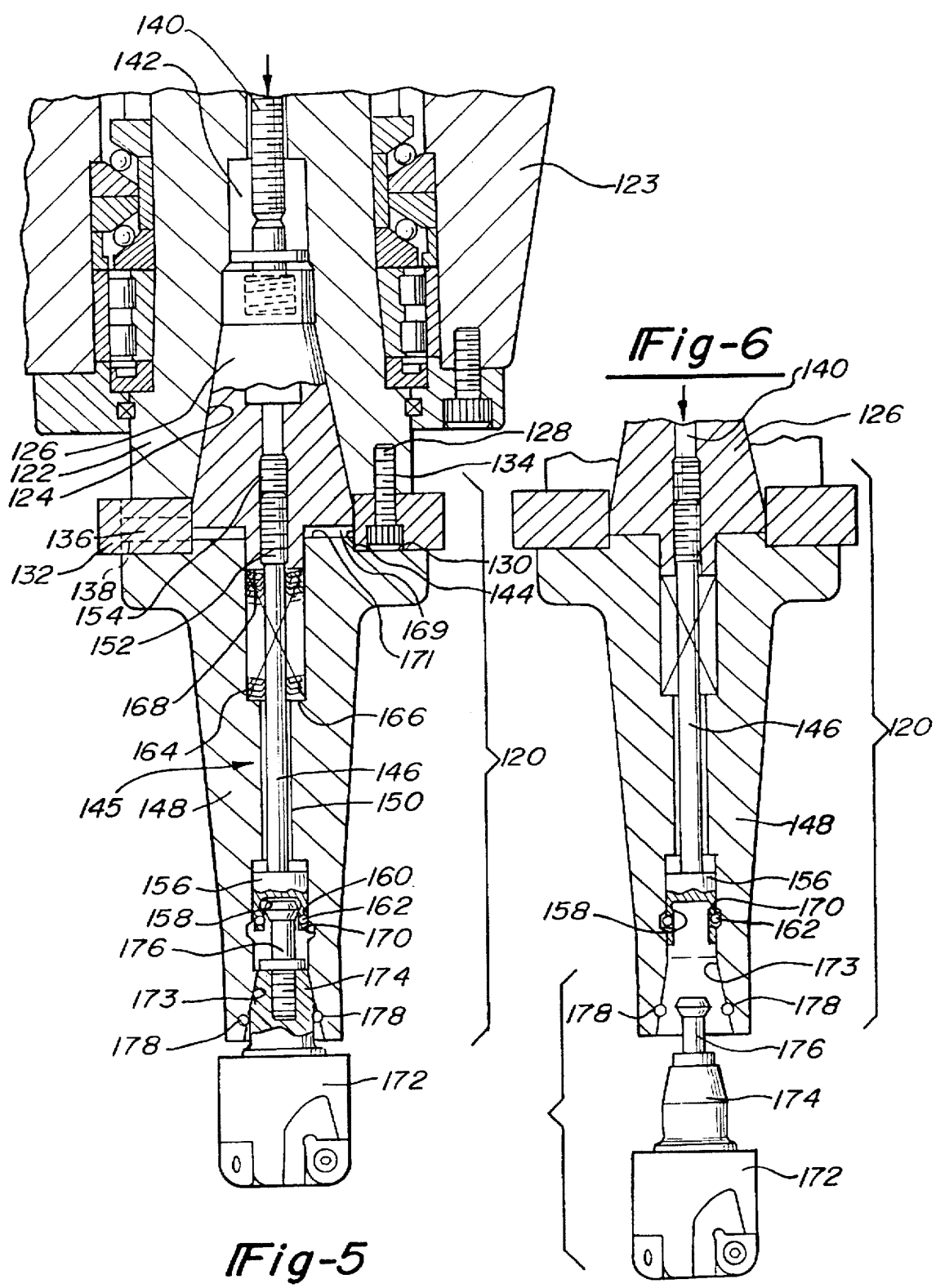
FIG. 5 is a longitudinal, cross-sectional view of another embodiment of the inventive spindle extension holding a tool firmly in place.
FIG. 6 is a longitudinal, cross-sectional view of one embodiment of the inventive spindle extension positioned to release or receive a tool.

FIG. 1 shows one embodiment of the inventive surrogate extension 10. Surrogate extension 10 has a generally cylindrical sleeve 12. In the illustrated embodiment, sleeve 12 has non-constant outer diameters. A larger outer diameter is shown in the lower portion of the sleeve 12 beneath the flange 14. The portion of the sleeve 12 shown above flange 14 is of a smaller outer diameter and has a slightly tapered shape. This upper portion of the sleeve 12 is to be received into the host machine spindle 15 (schematically shown in phantom). The lower portion of sleeve 12 contains a generally conical bore 16 at a tool receiving end 17. The upper portion of the sleeve 12 contains a bore 18 having a nominal radius and a bore 20 of a slightly larger radius adjacent bore 18. An extension draw bar assembly 21 includes draw bar 22, which is slidably received within bore 18. At one end of extension draw bar assembly 21 is a pull sleeve 24. Pull sleeve 24 has an axial bore 26 and a plurality of radial bores 30 each receiving a ball 32. In one embodiment there are preferably 5 radial bores 30. Balls 32 rest within each radial bore 30 such that each ball 32 can move radially, partially protruding into axial bore 26 while being restricted from moving axially relative to pull sleeve 24.

Extension draw bar assembly 21 is shown in a retracted position such that pull sleeve 24, in conjunction with balls 32, is grasping and holding a tool pull stud 34 firmly in place. Tool pull stud 34 is connected to tool holder 36 in a conventional manner and tool holder 36 is connected to a tool 37, also in a conventional manner.

At the end of extension draw bar assembly 21 opposite from pull sleeve 24 is a pull stud 38 adjustably connected to extension draw bar 22 such that the overall length of the draw bar assembly 21 is adjustable. Applicant also considers the pull stud and the pull sleeve (described below) as a pull member. Pull stud 38 is grasped by the host machine power draw bar apparatus (not shown) such that extension draw bar 22 is pulled in a retracted position (upward according to the drawing).

In one embodiment, the inventive surrogate extension is preferably designed to receive a cutting tool including a national machine tool 50 taper. A national machine tool 50 taper tool connection provides a much stronger connection over 2 inch diameter weldon shank connections. The 50 taper tool connection has the advantage of reducing cutting tool runout and improving dimensional control of the workpiece. The 50 taper tool connection within the inventive spindle extension provides a longer useful life compared to the weldon shank spindle extensions. The inventive spindle extension, therefore, provides for greater surface contact between the tool holder and the extension, therefore, yielding a stronger and more efficient tool connection. Moreover, the inventive surrogate extension allows an operator to use standard heavy milling tools and the host machine power draw bar apparatus while protecting the host machine spindle from undesirable wear. Therefore, the inventive surrogate extension enhances efficiency during a standard heavy milling operation.

The inventive surrogate extension works generally as follows. Surrogate extension 10 is connected to the spindle of the host machine 39 (shown schematically in phantom) in a conventional manner including bolts 40 which are inserted through counter bore 42 on flange 14. The spindle extension 10 is prevented from rotating relative to the host machine spindle by driving dogs 45 on the host machine 39, which fit into slots 44 on flange 14. Preferably, a plurality of bolts and driving dogs are employed, however, FIG. 1 only illustrates one of each. When surrogate extension 10 is connected to the host machine spindle the upper portion of sleeve 12 is received within the bore on the host machine spindle that normally receives a milling tool. Surrogate extension 10 may be centered on spindle 15 in a conventional manner; for example by a locator ring.

Spring 46 biases extension draw bar assembly 21 upward into the host machine spindle 15. Spring 46 bears against reaction surface 48 defined on the sleeve 12 and reaction surface 50 defined on the extension draw bar assembly 21. Spring 46 preferably maintains pull stud 38 in a position where it may be grasped by the host machine power draw bar apparatus. Spring 46 provides the additional advantage of allowing some axial movement by extension draw bar assembly 21 when the host machine power draw bar apparatus contacts pull stud 38. In this manner, the host machine is protected from potential damage. In some applications it may be feasible to eliminate spring 46.

Tool holder 36 is preferably tapered and placed within the generally conical bore 16 in the tool receiving end 17 of surrogate extension 10. A machine operator can activate the host machine power draw bar apparatus, typically by pressing an actuating button. The host machine power draw bar correspondingly moves into a position to grasp pull stud 38. The host machine power draw bar then grasps pull stud 38 in a conventional manner as it retracts into the host machine, thereby, drawing extension draw bar assembly 21 inward toward the host machine 39 (upward according to the drawing). This action causes balls 32 (which were previously resting within bore 20) to protrude radially inward into pull sleeve bore 26 as the balls 32 bear against bore 18. Pull sleeve 24 thus, firmly grasps pull stud 34. During this movement, pull stud 34 and, consequently, tapered shank tool holder 36 are drawn inward into the spindle extension 10 and the tool 37 is held firmly in place. Tool holder 36 preferably is shaped such that the tool cannot rotate relative to the spindle extension 10.

FIG. 2 shows one embodiment of the inventive long-reach spindle extension 60. Long-reach extension 60 has a generally cylindrical sleeve 62 connected to flange 64. In the illustrated embodiment, flange 64 is disposed at one end of sleeve 62. Long-reach extension 60 is connected to the host machine spindle 65 in a conventional manner; similar to that described with reference to FIG. 1. The spindle extension 60 is prevented from rotating relative to the machine spindle by driving dogs 43 that fit into slots 44 on flange 64. Accordingly, tool receiving end 66 on sleeve 62 points in a direction away from the host machine spindle 65 when extension 60 is appropriately connected to a host machine 67.

Tool receiving end 66 contains a generally conical bore 68 that contains driving pins 70. Driving pins 70 are maintained within the tool receiving end 66 of long-reach extension 60 such that a minimum outer diameter of sleeve 62 can be maintained. A smaller outer diameter is advantageous for long-reach spindle extensions because the smaller diameter provides a higher clearance profile for deep bore milling operations. A higher clearance profile corresponds to tighter tolerances in the workpiece. Maintaining driving pins 70 within the spindle extension 60 prevents a tapered shank milling tool from rotating relative to the spindle extension 60 while maintaining the smallest possible outer diameter. Driving pins 70 within tool receiving end 66, therefore, eliminate the need for any set screws or external collet nuts and allow for more accurate milling while increasing operation efficiency.

Sleeve 62 contains a bore 72 of a nominal radius and an adjacent bore 74 with a radius slightly larger than the nominal radius of bore 72. Extension draw bar assembly 75 includes draw bar 76 which is slidably received within bore 72 such that one end of extension draw bar assembly 75 is disposed within sleeve 62 while an axially opposite end is disposed within the host machine spindle. Pull stud 78, connected to draw bar 76, is grasped and axially displaced by the host machine power draw bar apparatus when desired. Axially opposite pull stud 78 on bar assembly 75 is a pull sleeve 80 that contains an axial bore 82. Pull sleeve 80 also contains a plurality of radial bores 84 that receive balls 86. The pull sleeve in FIG. 2 is similar to that described with reference to FIG. 1 except that in a long-reach spindle extension the pull sleeve necessarily must be of a smaller cross-sectional dimension. Pull sleeve 80 works according to the description of pull sleeve 24 with reference to FIG. 1 in order to grasp pull stud 88 connected in a conventional manner to tapered shank tool holder 90 to thereby maintain tool 91 in proper position relative to spindle extension 60.

Spring 92 bears at one end against reaction surface 94 defined on the sleeve 62 and at the other end against reaction surface 96 defined on extension draw bar 76. Spring 92 serves the same function for the long-reach spindle extension 60 that spring 46 served relative to the surrogate extension 10 described above.

The overall operation of the long-reach spindle extension parallels that described above with reference to the surrogate extension 10 and FIG. 1. However, there is one important difference between a long-reach spindle extension and a surrogate extension. A long-reach extension, as described above, must have a minimum outer diameter to maintain a high clearance profile. Accordingly, extension draw bar assembly 75 must have a minimum diameter.

In one embodiment, draw bar 76 fits within bore 72 which has a 1.625 inch diameter. Tool holder 90 preferably has a 20 degree included angle and pull stud 88 has a 0.625 inch diameter. These dimensions are suitable for a 2 inch diameter cutting tool 91, for example. Accordingly, extension draw bar assembly 75 has a relatively small diameter.

A small diameter extension draw bar and/or tool holder may not be adaptable to the forces applied by a host machine hydraulic power draw bar apparatus. Specifically, typical machine draw bars may exert forces great enough to shear a small diameter extension draw bar or tool holder. The inventive spindle extension overcomes the problem of non-adaptability of a small diameter extension draw bar by providing pull stud draw bar assembly 75. Bar assembly 75 is adjustable in length through adjusting means 98.

Adjusting means 98 can be any means that facilitates adjusting the length of extension draw bar 76 while providing a strong axial connection between relatively adjustable portions of the extension draw bar assembly. In one embodiment, adjusting means 98 is a threaded member 99 situated such that draw bar 76 threads into a bottom end of member 99 while pull stud 78 is connected to a top end of member 99. Draw bar 76 and pull stud 78 can be threaded along member 99 to adjust the length of the bar according to the needs of the particular machine operator.

The length that extension draw bar 76 is adjusted cannot be randomly guessed without avoiding potential tool failure or damage to the host machine. The lengthening must be precisely calculated to achieve proper tool connection to the spindle extension 60 while avoiding damage to the host machine.

One method of determining the proper length adjustment of extension draw bar 76 includes the use of a gauge 100 as illustrated in FIG. 3. Gauge 100 is shaped to fit within a host machine spindle tool receiving end. Gauge 100 contains a piston 102 having a threaded end 104. A pull stud 106 and, if necessary, spacers 107, can be connected to the threaded end 104 of piston 102. Gauge 100 is inserted into the host machine spindle and the host machine power draw bar apparatus is activated. The host machine power draw bar will pull upon pull stud 106 moving piston 102 in an upward direction according to the drawing. Dial 108 registers the amount of pressure built up within chamber 110. Chamber 110 can contain, for example, air or oil. In this manner, the pressure exerted by the host machine power draw bar apparatus can be gauged.

Assume for example, that a machine operator realizes that he needs to use a long-reach spindle extension having a milling tool connected to it by approximately 2,000 lbs. of pressure. The machine operator can connect pull stud 106 to the threaded end 104 of piston 102 and insert gauge 100 into the host machine spindle. Activating the host machine power draw bar apparatus provides a reading on dial 108 of how much pressure is exerted by the host machine power draw bar apparatus. The machine operator can then deactivate the host machine draw bar apparatus and remove gauge 100 from the spindle. The operator can then insert spacers 107 between pull stud 106 and gauge housing 109 and repeat the gauging operation just described. Assume further, that the machine operator inserted a ⅛ inch spacer between the pull stud 106 and gauge housing 109 and that the dial now reads 2,000 lbs. when the host machine power draw bar apparatus is fully activated. Now, the machine operator realizes that he must adjust extension draw bar 76, by lengthening it ⅛ of an inch for example, to achieve the desired pull pressure of 2,000 lbs. using that particular host machine.

Such gauging is possible given the nature of a typical host machine power draw bar apparatus. Referring now to FIGS. 4(a) through 4(c), compression springs 112 typically employed in connection with a host machine power draw bar apparatus are shown in various configurations. FIG. 4(a) shows a pair of compression springs in a relaxed position. Such a relaxed position corresponds to a deactivated host machine power draw bar. In such a position, the springs exert no pulling power. FIG. 4(b) shows a pair of compression springs fully compressed. A fully compressed position corresponds to 100% pulling power as the springs 112 strive to expand to a relaxed position. The springs are fully compressed when the host machine draw bar moves outward relative to the host machine spindle to its maximum longitudinal displacement. This displacement is commonly referred to as host machine power draw bar travel.

Typically, a standard milling tool pull stud is grasped by the host machine draw bar as described above when compression springs 112 are in a position as illustrated in FIG. 4(b). Allowing compression springs 112 to relax to a position somewhere between the position illustrated in FIG. 4(a) and the position illustrated in FIG. 4(b) provides a varied amount of pulling power from the host machine power draw bar apparatus. For example, FIG. 4(c) shows a pair of compression springs 112 in a 50% relaxed position. Assuming, for example, that the host machine draw bar apparatus typically exerts forces on the order of 10,000 lbs. in a fully compressed position as illustrated in FIG. 4(b), FIG. 4(c) may correspond to a pull force of approximately 5,000 lbs. By using the gauge 100, as described in connection with FIG. 3, a machine operator can determine what axial distance compression springs 112 must effectively relax to achieve the desired pulling pressure for the particular milling operation. In this manner, the extension draw bar assembly 75 on the inventive long-reach spindle extension 60 can be adjusted accurately to provide safe, quick and secure tool connections by utilizing the host machine draw bar apparatus in tandem with the extension draw bar assembly 75. Therefore, it becomes possible to efficiently utilize tapered shank tool connections in milling operations where a spindle extension is desirable or necessary.

Referring now to FIG. 5, an alternative embodiment of the inventive spindle extension 120 is connected to a spindle 122 of a standard milling machine 123. Spindle 122 contains a conical bore 124 which is adapted to receive a tapered shank 126 from spindle extension 120.

Spindle extension 120 is fastened to spindle 122 using threaded bolts 128 which pass through a bore 130 of the flares 132 and thread into threaded bores 134 in spindle 122. In this manner, the spindle extension is held firmly against spindle 122. Spindle extension 120 is prevented from rotating with respect to spindle 122 by driving dogs 136 which fit into circumferentially-spaced slots 138 contained on the flange 132. One preferred embodiment contains 4 threaded bolts 128 and corresponding bores 134 and two driving dogs 136 with corresponding slots 138. The cross-section of the figure extends through one of each type member.

The shank 126 is situated within the conical bore 124 such that the power draw bar 140 of the host machine, which has an end pull sleeve 142, contacts an inner end of shank 126. When pull sleeve 142 applies a compressive force onto shank 126, the shank will move in an outward direction relative to the spindle, further into a central bored recess 144 within flange 132. The outward motion of the tapered shank causes power draw bar assembly 145 to move axially in relation to a cylindrical extension sleeve 148 of the spindle extension 120. Power draw bar assembly 145 includes shank 126 and a draw bar 146. Power draw bar 146 is slidably carried within an internal cylindrical bore 150 of the cylindrical sleeve 148. The motion of tapered shank 126 causes the power draw bar assembly 145 to move outward relative to the cylindrical sleeve 148. A threaded end 152 of power draw bar 146 is preferably inserted into a threaded bore 154 of the tapered shank 126 such that the two move integrally. The threaded connection provides the advantage of allowing the overall length of power draw bar assembly 145 to be adjusted. This advantage will be further described below. A pull sleeve 156 is disposed at the opposite end of the power draw bar assembly 145 and has a cylindrically bored center 158, radially bored holes 160 and ball bearings 162.

Power draw bar assembly 145 is biased inwardly by disc springs 164. The disc springs 164 are set between a reaction surface 166 defined within the cylinder 150 and a reaction surface 168 defined upon the bar 146. The disc springs 164 bias power draw bar assembly 145 into the cylindrical sleeve 148 towards a retracted position. When power draw bar assembly 145 is maintained in this retracted position, a gap 169 exists between the tapered shank 126 and an outermost end 171 of the central bored recess 144 of the flange 132. In the same position, ball bearings 162 are maintained just above a notch 170 defined within the cylindrical bore 150. In this position the inner surface of cylindrical bore 150 forces ball bearings 162 radially inwardly, and further into cylindrically bored center 158 of pull sleeve 156 to hold a tool in place as described further below.

Upon activation of the host machine power draw bar 140, pull sleeve 142 moves outwardly relative to the spindle and contacts and presses upon tapered shank 126. Power draw bar assembly 145 is then forced to move outward relative to cylindrical sleeve 148. As shown in FIG. 6, as power draw bar assembly 145 moves outwardly, ball bearings 162 become aligned with, and may move radially outward into notch 170. A machine operator may properly align and then insert tool 172 into a conically bored portion 173 of the cylindrical sleeve 148. The portion of the tool 172 that fits into the conically bored portion 173 includes the tapered tool holder 174 which has a tool chuck 176 connected to it in a conventional manner. Tool chuck 176 is preferably shaped so that it bears against ball bearings 162 moving them radially outward into notch 170 when the tool 172 is inserted into cylindrical extension 148. The tool can be removed in the reverse manner. Once the tool has been inserted so tool chuck 176 is within the cylindrically bored center 158 of pull sleeve 156, the inventive power draw bar apparatus can hold the tool in the spindle extension, as it retracts back into the cylindrical sleeve 148 as will be explained below.

Deactivating the host machine power draw bar 140 causes pull sleeve 142 to move inwardly into host machine 123 and removes the force applied to the tapered shank 126, thereby enabling the disc springs 164 to bias power draw bar assembly 145 inward into the spindle extension 120. The ball bearings 162 are forced out of notch 170 as they bear against cylindrical bore 150. Ball bearings 162 are thereby moved radially into the cylindrically bored center 158 of the pull sleeve 156, effectively grabbing the tool chuck 176 and pulling it inward. In this manner the tool 172 is pulled tightly in the conically bored portion 173 of the cylindrical sleeve 148 as illustrated in FIG. 5.

Tapered tool holder 174 is also preferably adapted to fit against driving pins 178 contained within the conically bored portion 173 of the cylindrical extension 48. The pins are set such that a tool held in the spindle extension butts up against the pins and does not rotate relative to the spindle extension. The pins preferably are set radially opposite and parallel to each other. In this manner, the tool 172 is held rotationally still in the spindle extension 20 and ready for a standard milling operation.

Power draw bar assembly 145 is preferably adjustable in overall length. The adjustment preferably varies the size of gap 169 by means for compensating for variable host machine draw bar travel. In the illustrated embodiment, the compensating means includes the threaded connection between shank 126 and bar 146. The size of gap 169 is varied by adjusting the relative longitudinal positions of shank 126 and bar 146.

Assembly 145 should have a variable length to accommodate a variety of host machines. Milling machine power draw bar apparatus vary in several respects. One varying feature is the travel of the power draw bar within the host machine spindle. If extension 120 is employed on a machine with a travel that exceeds the size of gap 169, damage could result to the host machine or extension 120 when securing a tool as described above because shank 126 will bottom-out against flange 132.

To ensure that a minimum gap 169 exists, a machine operator should measure the travel of the particular draw bar apparatus in a conventional manner. The known travel distance can then be used to appropriately adjust the length of assembly 145 and, the size of gap 169 therefore, to avoid possible damage to the host machine or the spindle extension.

Referring now to FIGS. 7 through 9, another embodiment of this invention will be described. It is to be understood that, with respect to the embodiment illustrated in FIGS. 7 through 9, the principles of design and operation are the same as discussed with respect to the above detailed description of the embodiments of FIGS. 1 and 2, with the exception of the particular differences noted below. FIG. 7 is an illustration of a long reach spindle extension incorporating an adjusting means 300 that differs from the adjusting means 98 previously described.

FIG. 9 illustrates, in exploded view, the components of adjusting means 300, which are also illustrated in partial cross-sectional view in FIG. 7 and cross-sectional view in FIG. 8. Reference to all three figures will be made throughout the remainder of this description.

Adjusting means 300 includes draw bar 76 having a threaded end 302. Pull screw 304 is threadedly connected to the threaded end 302 of draw bar 76. Pull screw 304 includes an outer sleeve 306 and a first threaded bore 308 that receives the threaded end 302 of draw bar 76. Second threaded bore 310 is provided at the axially opposite end of pull screw 304 from the bore 308. Threaded bore 310 is adapted to receive a threaded host machine draw bar 312 as will be described in more detail below. The spacing 314 between the most internal axial end of first threaded bore 308 and the terminal end of the threaded end 302 of draw bar 76 provides for an adjustment in the length of the draw bar assembly 75. That is, the threaded end 302 of draw bar 76 can be selectively threaded into bore 308 such that the combined length of draw bar 76 and pull screw 304 are adjustable.

It is to be understood in this application, that Applicant refers to pull screw 304 and pull stud 78 generically as a pull member, respectively. Pull stud 78 and pull screw 304 serve the functional purpose of enabling a host machine draw bar to effectively grasp one end of draw bar assembly 75 and pull it inward into a machine spindle 65 (upward according to the drawings).

The embodiment illustrated in FIGS. 7 through 9 includes pins 316 that are preferably pressed into the outer sleeve 306 of pull screw 304. Pins 316 cooperate with slots 318 on slip guide 320. Slip guide 320 is preferably fixedly fastened to spindle extension 60 by set screws 322, although other conventional methods of fastening slip guide 320 to flange 64 of spindle extension 60 could be implemented. Slip guide 320, when appropriately fastened to spindle extension 60 prevents pull screw 304 from rotating relative to spindle extension 60 because pins 316, which are adapted to axially slide within slots 318, prevent pull screw 304 from rotating relative to slip guide 320 and, therefore, spindle extension 60.

As threaded draw bar 312, which is a conventional draw bar in some milling machines, moves downward (according to the drawing) and rotates such that threaded end 313 threadedly engages bore 310, it is desirable that pull screw 304 not rotate relative to spindle extension 60. Should pull screw 304 rotate relative to spindle extension 60 as draw bar 312 threadably connects to pull screw 304, a proper connection between the host machine draw bar 312 and the draw bar assembly 75 may not be achieved. Accordingly, the preferred embodiment incorporating adjusting means 300 includes slip guide 320 and pins 316 with cooperating slots 318 to prevent the undesirable rotation of pull screw 304 as just described.

The general operation of the embodiment of FIGS. 7 through 9 mirrors that of the embodiments previously described in connection with FIGS. 1 through 4c. The difference is found in the type of host machine draw bar. In the embodiments of FIGS. 1 and 2, the host machine draw bar has a pull sleeve at a terminal end that is adapted to grasp pull stud 38 or 78, respectively. When a host machine draw bar is of the type illustrated in FIGS. 7 and 9, pull screw 304 is threadedly connected to the terminal end 313 of the host machine draw bar 312. Otherwise, the operation of the spindle extension illustrated in FIGS. 7 through 9 is the same as that previously described.

FIGS. 10 and 11 show still another embodiment of the inventive spindle extension. In this embodiment, the milling machine 410 includes spindle 411, which is schematically illustrated in phantom. An extension sleeve 412 is connected to the host machine spindle 411 through flange 414, in a conventional manner (preferably in conformance with that described above). Draw bar assembly 416 is partially disposed within extension sleeve 412. Bar 418 is axially movable within the central bore 419 through extension sleeve 412. Pull member 420 is connected to bar 418 through adjustment member 422. Pull member 420 can be a pull stud such as pull stud 78 illustrated in FIG. 2, for example, or a pull screw such as that illustrated in FIG. 9. Adjustment member 422 is provided to enable a user to adjust the overall length of the draw bar assembly 416. Threaded adjustment couplings, such as those illustrated in the various drawings discussed above, have proven useful and, therefore, are the preferred embodiment.

Tool 424 differs from the tools illustrated and discussed above in that tool 424 is typically longer and heavier. Tool 424 includes a conical bore 426, which is preferably a female morse socket, and is received about the outside of extension sleeve 412. The outer surface of extension sleeve 412 is preferably ground finished into a male morse type taper. Morse type taper and socket combinations are especially useful in operations requiring high torque.

Tool 424 is maintained in axial alignment with extension sleeve 412 because pull sleeve 428, at the distal end of bar 418, effectively grasps pull stud 430 in the same manner as described above (such as, for example, pull sleeve 24 and pull stud 34 of FIG. 1). Pull stud 430 and nut 432 cooperate such that when pull stud 430 is pulled inward toward the machine (upward according to the drawing) nut 432 is received within counterbore 434 and tool 424 is maintained in proper axial alignment with extension sleeve 412. Pull stud 430 is preferably threadedly coupled to nut 432 after pull stud 430 is placed within through bore 435 in tool 424.

Slots 436 are preferably provided on each side of tool 424 to cooperate with stops 438, which are located on an outer surface of sleeve 412. Stops 438 are preferably selectively removable driving dogs. In the preferred embodiment, two driving dogs 438 are radially opposite each other. (Only one stop 438 is specifically shown in FIG. 11.) When stops 438 are properly received within slots 436, tool 424 is prevented from rotating relative to extension sleeve 412. Therefore, when spindle 411 rotates, tool 424 rotates in unison with spindle 411 and extension sleeve 412. For illustration purposes, cutting insert 440 is shown at one of tool 424 and is a typical cutting insert used for standard milling operations.

Apart from the specific differences noted, the illustrated embodiment of FIGS. 10 and 11 operates in essentially the same manner as those described above. Various combinations of the elements from the different embodiments described herein are possible. For example, when the host machine has a screw-type power draw bar apparatus, it is preferable to use a pull member such as pull screw 304, illustrated in FIG. 9. In such an embodiment, slip guide 320 would be employed with extension sleeve 412. Also, although not specifically illustrated, it is most preferable to have an extension sleeve with a tool receiving conical bore inside of the extension sleeve and an outer surface that receives a tool about the outer surface of the extension sleeve for greatest versatility. Other combinations or variations and modifications will become apparent to those skilled in the art that do not depart from the purview and spirit of this invention.

It will be apparent to those skilled in the art that the foregoing disclosure is exemplary in nature rather than limiting, the invention being limited only by the appended claims.

I claim:

1. A machine for milling operations, comprising:
   a spindle that rotates about a spindle axis and has a terminal end;
   an extension having a first extension end removably connected to said spindle adjacent said spindle terminal end and a second extension end distal from said first end, said second end being adapted to be coupled to a tool, said extension being connected to said spindle such that said extension rotates with said spindle, said extension having a stop for preventing a tool that is coupled to said extension from rotating relative to said extension;
   a draw bar assembly having an adjustable length and being disposed partially within said extension and axially moveable relative to said extension, said assembly including a pull member at one end of said assembly and having a second end for engaging a tool; and
   an actuator for engaging said pull member and axially moving said draw bar assembly in a direction toward said spindle such that said draw bar assembly second end engages a tool.

2. The machine of claim 1, wherein said extension second end is adapted to be received within a cooperating bore defined in a tool.

3. The machine of claim 1, wherein said stop on said extension comprises a raised member protruding outward from an outer surface of said extension.

4. The machine of claim 1, wherein said stop on said extension comprises a selectively removable driving dog that extends generally radially outward from an outer surface on said extension.

5. The machine of claim 1, wherein said pull member comprises a pull stud.

6. The machine of claim 1, wherein said pull member comprises a pull screw.

7. The machine of claim 6, further comprising a slip guide member for preventing said pull member from rotating relative to said extension.

8. The machine of claim 7, wherein said slip guide member has a generally cylindrical bore defined axially therethrough and a slot extending generally radially outward from said bore and wherein said pull member includes a generally radially outward extending pin that is cooperatingly received within said slot.

9. The machine of claim 1, wherein said second end of said draw bar assembly comprises a pull sleeve at one end of a bar.

10. The machine of claim 1, wherein said draw bar assembly comprises a bar that is connected to said pull member by an adjustable connector at a first bar end and wherein said second end of said draw bar assembly is defined by a second end of said bar, which comprises a pull sleeve.

11. The machine of claim 10, wherein said connector comprises at least one of said pull member and said bar having a threaded end, a threaded member being coupled to said threaded end such that said bar and pull member can be rotated relative to each other to thereby adjust a length of said draw bar assembly.

12. A spindle extension for attachment to a spindle of a milling or drilling machine, comprising:
   an extension sleeve having a generally cylindrical portion terminating at a second sleeve end, said second sleeve end being adapted to be coupled to a tool such that the tool is maintained rotationally fixed relative to said sleeve said extension sleeve having a first sleeve end that is adapted to be connected to a machine spindle; and
   an adjustable length draw bar assembly including a bar partially disposed and axially moveable within said sleeve, a first end of said bar being at an end distal from said sleeve first end and being adapted to engage a tool, a pull member connected to said bar near a second end of said bar, said pull member being adapted to be received in the machine spindle, and means for adjusting a length of said assembly.

13. The spindle extension of claim 12, wherein said adjusting means comprises at least one of said pull member and said bar having a threaded end that cooperates with a mating threaded member such that said bar and said pull member can be manipulated relative to each other to thereby adjust a length of said draw bar assembly.

14. The spindle extension of claim 12, wherein said second sleeve end comprises a male morse type taper adapted to be received in a female morse socket on a tool.

15. The spindle extension of claim 12, wherein said extension sleeve includes an externally disposed stop member for preventing a tool from rotating relative to said sleeve.

16. The spindle extension of claim 15, wherein said stop member comprises a selectively removable driving dog that extends generally radially outward from an outer surface of said sleeve.

17. The spindle extension of claim 12, wherein said first end of said bar comprises a pull sleeve that is adapted to engage a tool holder such that the tool is prevented from moving axially relative to said bar.

18. The spindle extension of claim 12, further comprising a spring carried on said draw bar assembly and having ends in contact with a reaction surface defined on said sleeve and a second reaction surface defined on said draw bar assembly, respectively, said spring biasing said draw bar assembly in a direction from said second sleeve end toward said first sleeve end.

19. The spindle extension of claim 12, wherein said pull member comprises a pull stud.

20. The spindle extension of claim 12, wherein said pull member comprises a pull screw and said spindle extension further comprises a guide member that prevents said pull screw from rotating relative to said extension sleeve.

* * * * *